United States Patent [19]
Mahan

[11] Patent Number: 5,231,769
[45] Date of Patent: Aug. 3, 1993

[54] TAPE TIP BODY FOR ACCURATE ROOF MEASUREMENT

[76] Inventor: Frank H. Mahan, 98 Windmill Rd., San Antonio, Tex. 78231

[21] Appl. No.: 866,349

[22] Filed: Apr. 10, 1992

[51] Int. Cl.⁵ .............................................. G01B 3/10
[52] U.S. Cl. ...................................... 33/770; 33/758; 33/759
[58] Field of Search ................. 33/755, 757, 758, 759, 33/760, 768, 769, 770, 771

[56] References Cited

U.S. PATENT DOCUMENTS

| | | |
|---|---|---|
| 14,947 | 9/1820 | Ballou . |
| 558,113 | 4/1896 | Rodick . |
| 856,938 | 2/1907 | Beller . |
| 1,044,811 | 4/1911 | Paquette . |
| 1,506,295 | 7/1922 | Forder . |
| 2,466,405 | 7/1945 | Fowler . |
| 2,606,371 | 9/1949 | Klimek . |
| 2,629,934 | 3/1953 | Scott . |
| 3,473,235 | 10/1969 | Quenot . |
| 3,745,663 | 7/1973 | Dodge ................................. 33/759 |
| 3,834,030 | 9/1974 | Hanson . |
| 3,965,579 | 6/1976 | Woods . |
| 4,462,166 | 7/1984 | Furlong . |

FOREIGN PATENT DOCUMENTS

| | | | |
|---|---|---|---|
| 2233097 | 1/1991 | United Kingdom | 33/755 |

Primary Examiner—William A. Cuchlinski, Jr.
Assistant Examiner—C. W. Fulton
Attorney, Agent, or Firm—Ronald P. Kananen

[57] ABSTRACT

A measuring tape tip body is described for attachment to a standard semi-rigid automatic-retrieval tape measure. The tape tip body allows the dimensions of a roof to be accurately determined by advancing the semi-rigid tape and tape tip body from the eave to the ridge of the roof without substantial interference due to roof shingles or tiles. This method and device allows steep, dangerous or unclimbable roofs to be measured safely and economically from the eave of the roof.

29 Claims, 7 Drawing Sheets

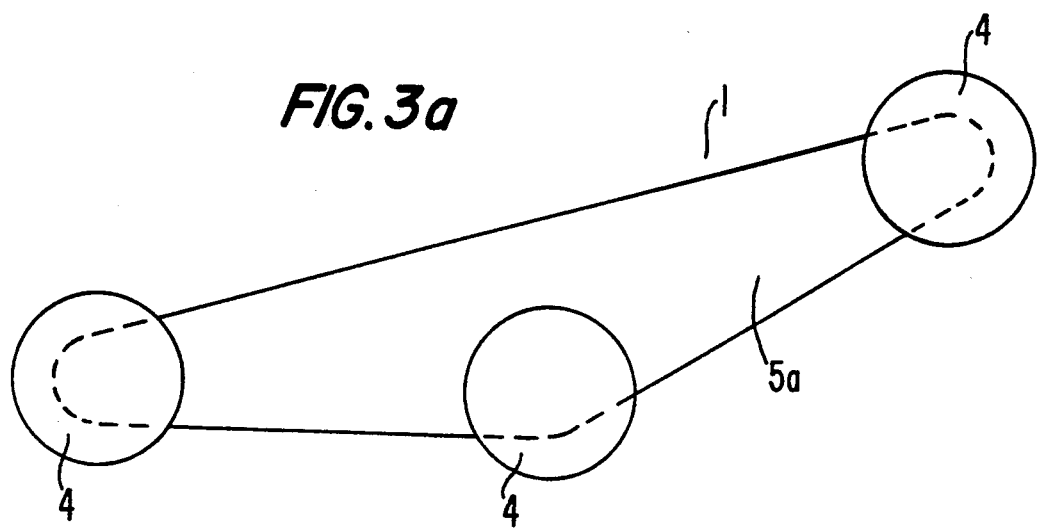
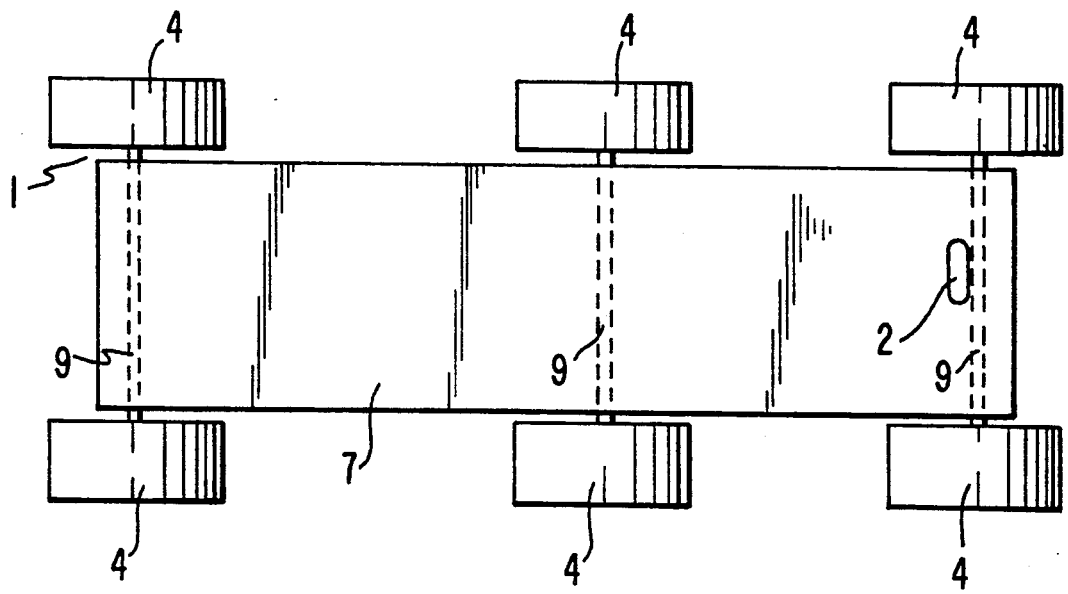

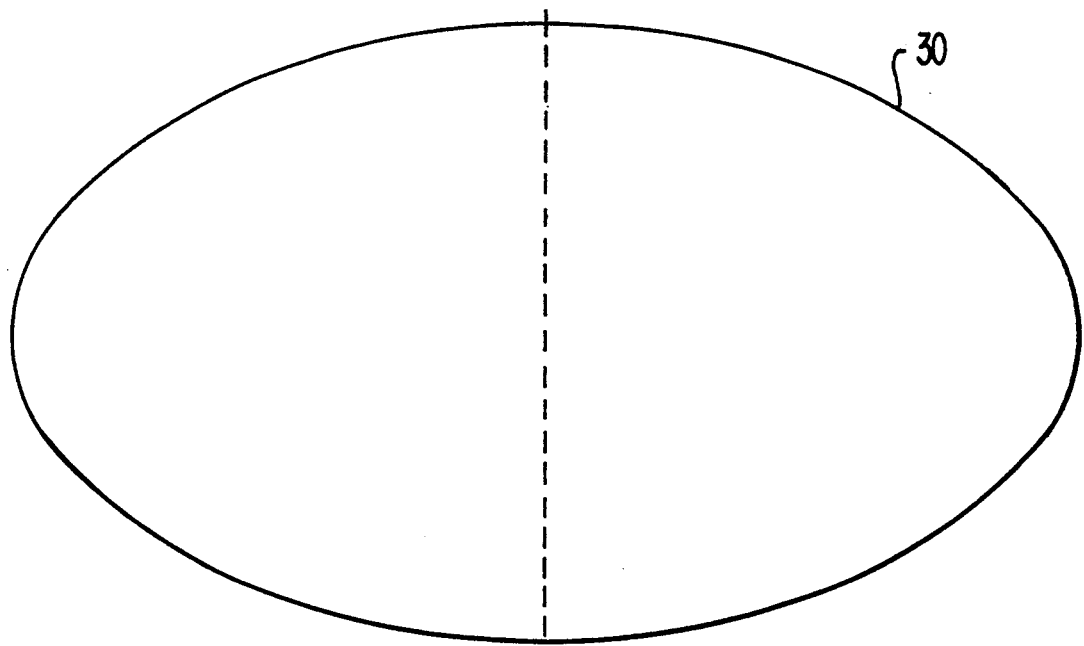
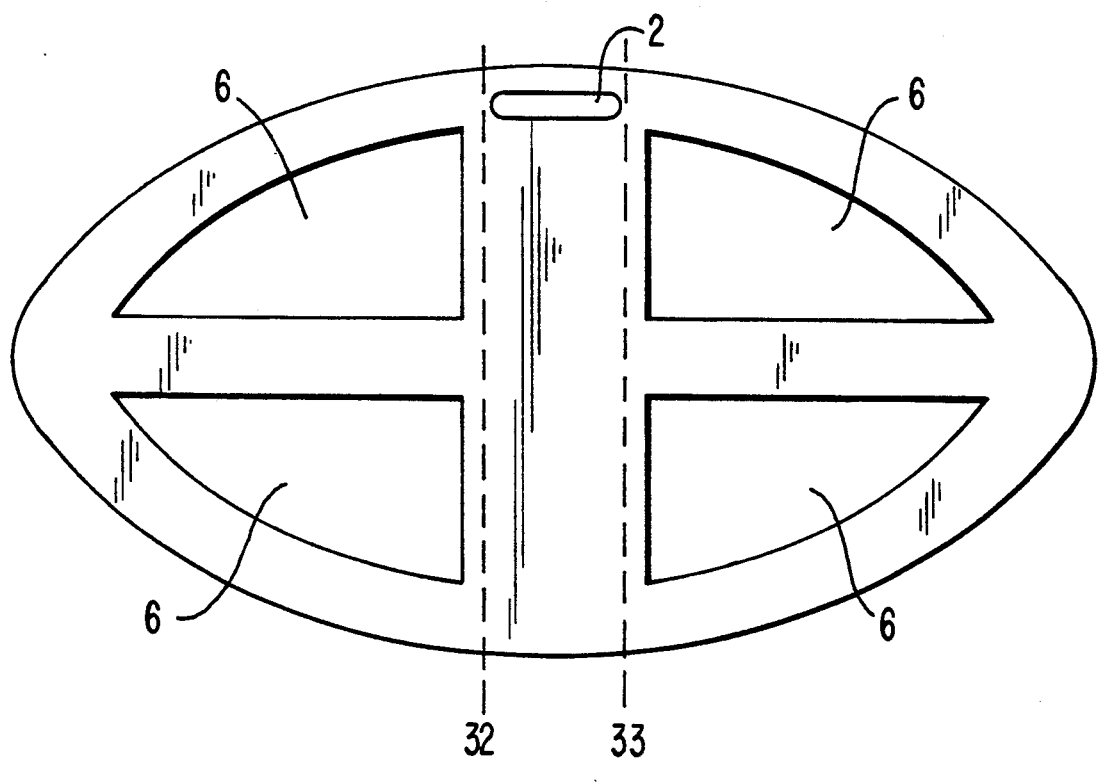

TAPE TIP BODY FOR ACCURATE ROOF MEASUREMENT

FIELD OF THE INVENTION

This invention relates to a device and method for the measurement of roof structures. Specifically, this invention relates to an improved device and method for safe and accurate measurement of steep-pitched, dangerous or unclimbable roofs.

BACKGROUND OF THE INVENTION

The dimensions of roofs are measured on a frequent basis by insurance adjustors, roofers and other professionals. At present, roofs are typically measured using two types of measuring tapes. One type of measuring tape is a semi-rigid automatic-retrieval tape available in 25- and 30-foot lengths, such as those produced by Stanley and Lufkin. A second type of measuring tape is a flexible 50- or 100-foot tape which is retrieved by use of a manual crank system. Each type of measuring tape has problems when used on steep, dangerous or unclimbable roofs. These problems will be addressed separately below.

1. Semi-Rigid, Automatic-Retrieval Measuring Tape

Measurement of steep-pitched roofs is typically attempted while standing at the eave (bottom) level of the roof. To get a proper measurement of the roof without climbing, the tape must be extended up the slope of the roof to the ridge (top) of the roof. However, the small hook normally found at the end of the tape blade of such semi-rigid automatic-retrieval measuring tapes tends to catch the edges of the roof shingles or tiles, causing the tape blade to buckle and fall back. Moreover, even if the tape can be successfully extended to the top of the roof, the user has no visual point of reference which will allow him or her to determine when the tip actually reaches the ridge of the roof. Thus, accurate measurement of the roof from the eave is difficult to achieve using a semi-rigid automatic-retrieval measuring tape. For those roofs that are too steep to climb, measurement must, nonetheless, be conducted from the eave, subject to the above inaccuracies and difficulties. For those roofs that are climbable, even though dangerous, the user normally climbs the roof so that an accurate measurement of the roof can be made by direct measurement of the ridge-to-eave distance using the semi-rigid automatic-retrieval measuring tape.

2. Flexible Manual-Crank Tape

Presently two methods are used in which flexible manual-crank tape is used to measure steep, dangerous or unclimbable roofs. According to one method, a weight such as a tennis ball is attached to the tip end of the flexible tape. The tennis ball can then be rolled down the roof slope to the gutter or eave, thereby providing an accurate measurement. This method, of course, requires the user to embark upon a sometimes dangerous climb to the ridge of the roof. A second method of use requires the weighted flexible tape to be thrown up and over the ridge of the roof. The tape is then pulled back over the ridge. Measurement by this method, however, is possible only if the exact position at which the ball or weight comes over the ridge can be determined. This method is very difficult and the accuracy of the measurement is questionable. The user of the flexible tape may also incur a significant risk of danger because of the possibility of contact of the flexible metal tape with electrical wires. Although this method of roof measurement is not recommended, it is, nonetheless, sometimes practiced on steep or unclimbable roofs.

SUMMARY OF THE INVENTION

Accordingly, it is an object of the present invention to overcome these and other deficiencies in the prior art.

Specifically, it is one object of the present invention to provide a system for measuring roof dimensions which utilizes a tip device for a measuring tape that can be extended up a roof slope without the tip of the device catching or being impeded by the rough edges of the roof shingles or tiles.

It is a further object of the present invention to provide a tape tip device which will provide the user with a visual reference as to when the tape tip reaches the ridge of the roof, allowing an accurate measurement to be determined.

It is another object of the present invention to provide a tape tip device that will be easily retrievable over practically any rough surface, thereby extending the life of the measuring tape.

It is a further object of the present invention to provide insurance adjustors and roofers, for example, with a means by which they can safely and accurately measure steep, dangerous or unclimbable roofs.

It is yet another object of the present invention to gain increased productivity by shortening the time that is required to measure steep, dangerous or unclimbable roofs.

It is yet a further object of the present invention to provide increased safety while measuring steep, dangerous or unclimbable roofs by allowing the measurement to be conducted from the eaves of the roof.

Finally, it is an object of the present invention to provide a simple, cost-effective means for forming the tape tip measuring device of the present invention.

A tape tip body of the present invention thus includes an attachment portion having the contact region, for contact with said measuring tape, and transportation means, for allowing said tape tip body to negotiate rough roof surfaces.

Moreover, a tape tip measuring device of the present invention includes a graduated measuring tape which is attached to the tape tip body described above.

Furthermore, a method of forming a tape tip body of the present invention comprises the steps of obtaining a sheet of rigid or semi-rigid material, cutting the sheet to form a shape having at least one axis of symmetry, and folding the shape along at least one line parallel to the axis of symmetry to form first and second legs.

Finally, a method for accurately measuring the dimensions of steep pitched, dangerous or unclimbable roofs according to the present invention comprises the steps of obtaining a tape tip measuring device comprising a graduated measuring tape attached to a tape tip body of the present invention, advancing the tape tip body from an eave up the slope of the roof by feeding out the measuring tape, observing the position at which the tape tip body disappears from view to verify the exact location of the roof ridge, noting the reading of the measuring tape at the eave, and subtracting an empirically determined length from the reading to determine the length of the roof from the ridge to the eave.

DESCRIPTION OF THE DRAWINGS

FIG. 3a is an elevation view of a wheeled embodiment of a tape tip body of the present invention.

FIG. 3b is a plan view of the wheeled embodiment of FIG. 3a.

FIG. 4b is a plan view of the tracked embodiment of FIG. 4a.

FIG. 11 illustrates a substantially oval shape which is produced according to a method for making an embodiment of the tape tip body.

FIG. 12 illustrates the oval shape of FIG. 10 after additional method steps have been performed.

DESCRIPTION OF THE PREFERRED EMBODIMENT

Figure 1:
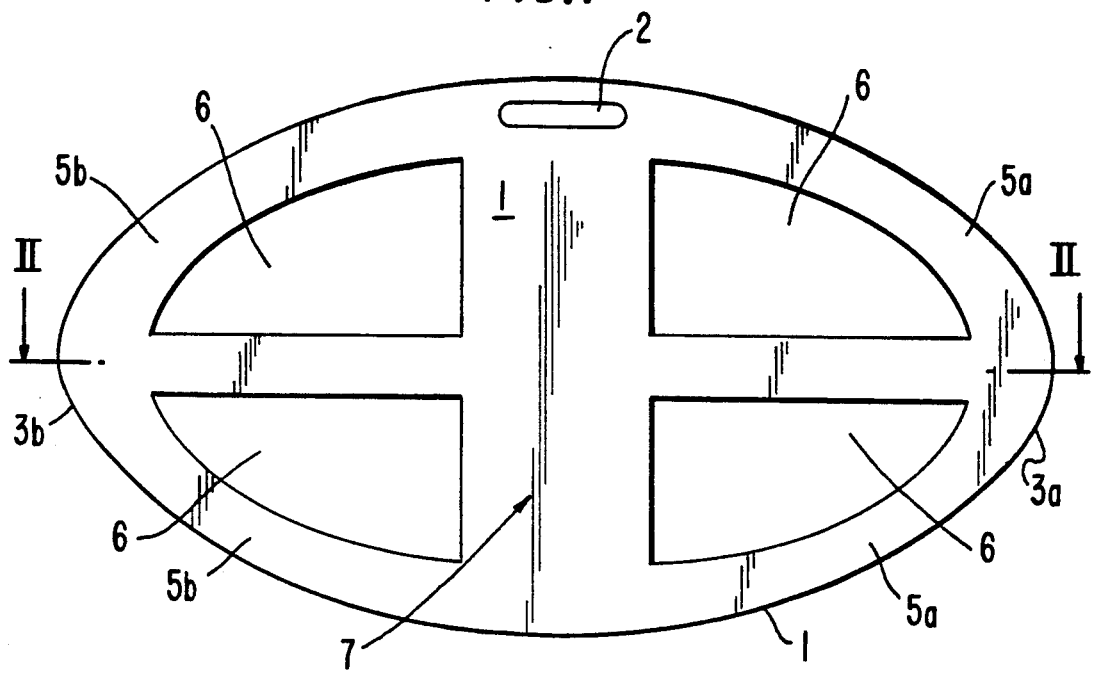
FIG. 1 is plan view of an embodiment of the tape tip body of the present invention.
Figure 2:
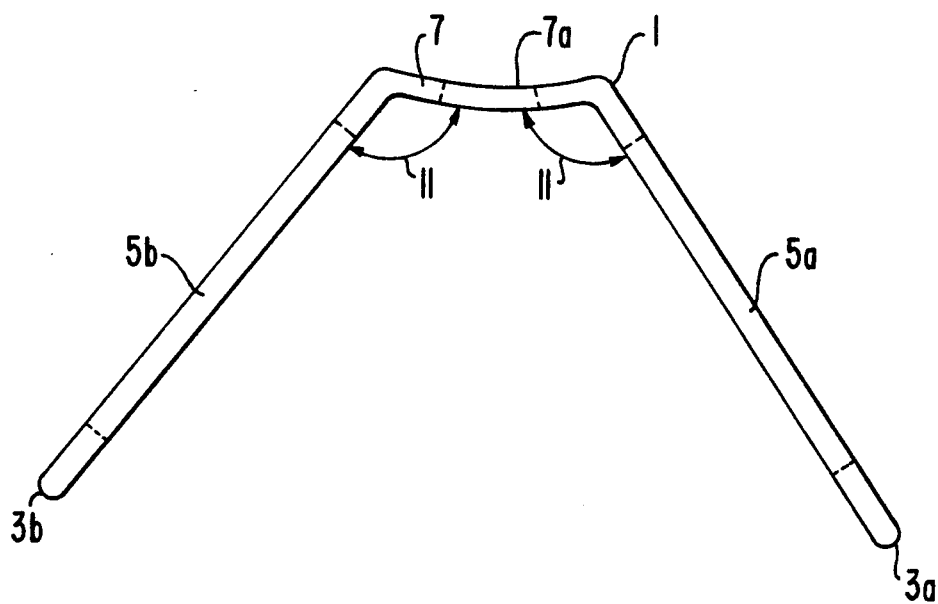
FIG. 2 is an elevation view of the tape tip body embodiment of FIG. 1.
Figure 4A:
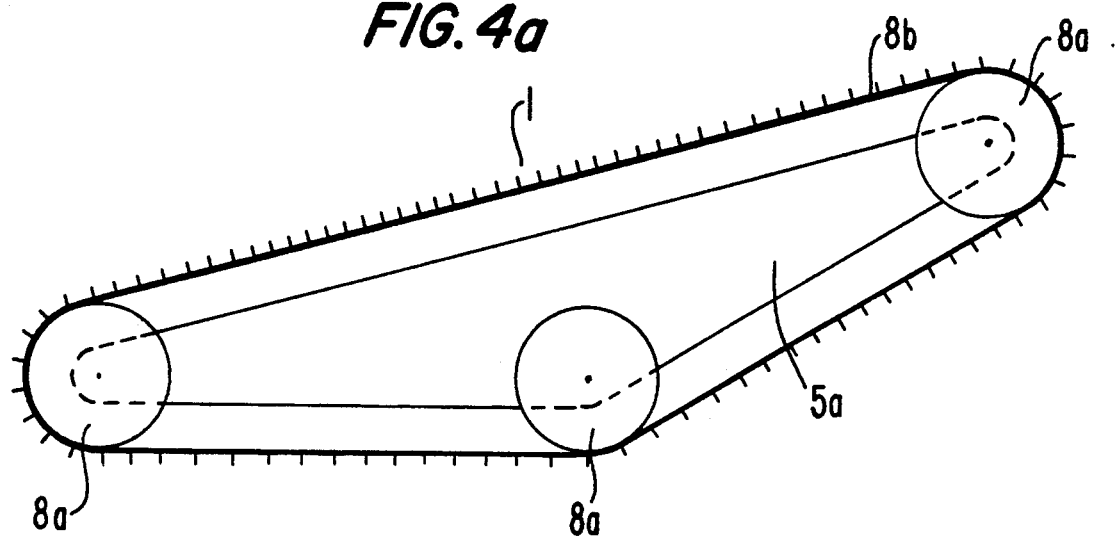
FIG. 4a is an elevation view of a tracked embodiment of a tape tip body of the present invention.
Figure 4B:
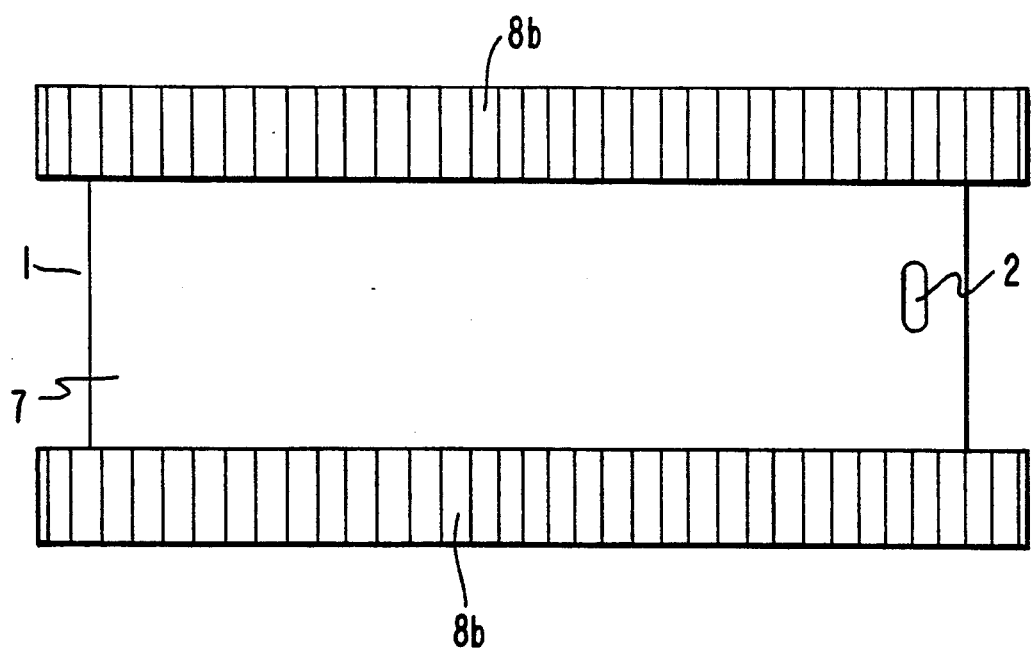
Figure 5:
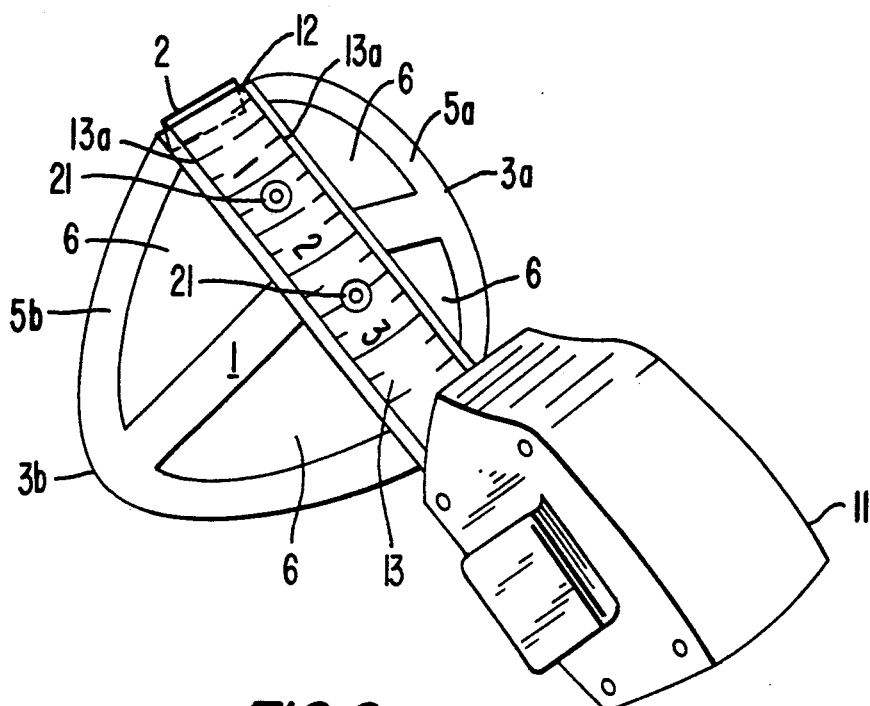
FIG. 5 is a perspective view of a tape tip measuring device according to an embodiment of the present invention wherein a measuring tape is attached to a tape tip body by means of pop rivets.
Figure 6:
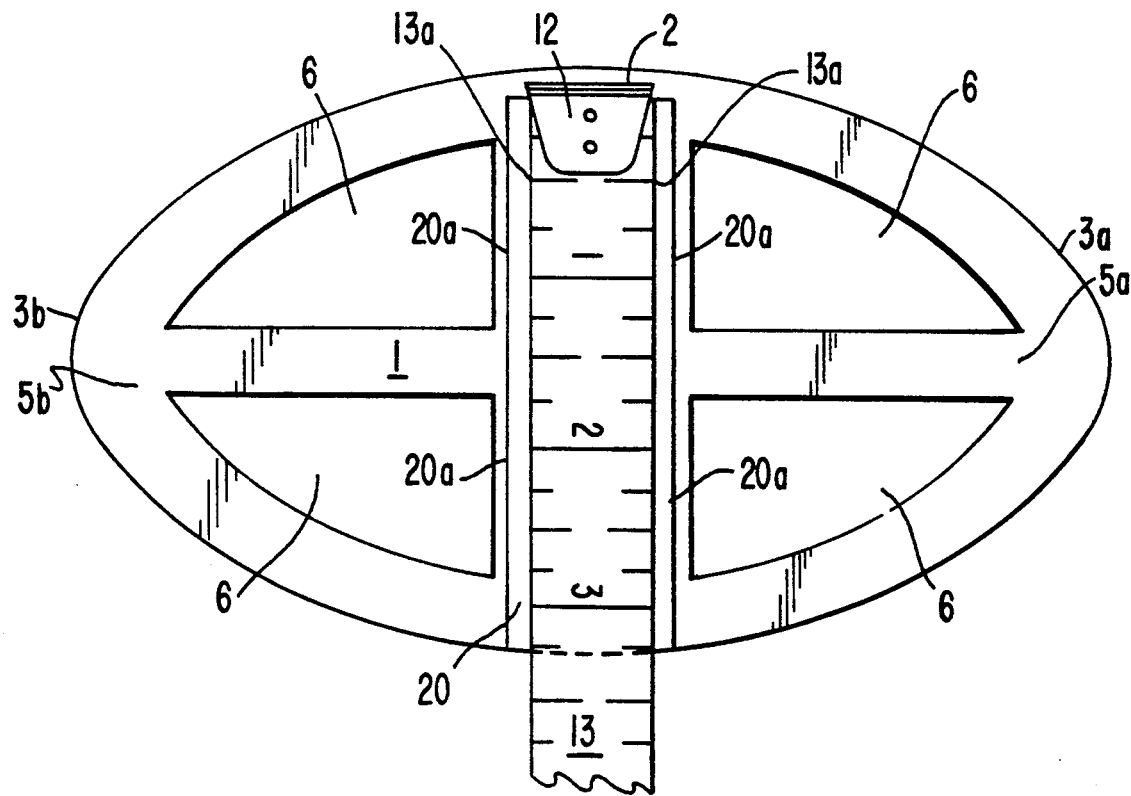
FIG. 6 is a plan view of a tape tip body measuring device according to a embodiment of the present invention wherein a measuring tape is attached to a tape tip body by means of a transparent retaining member.
Figure 7:
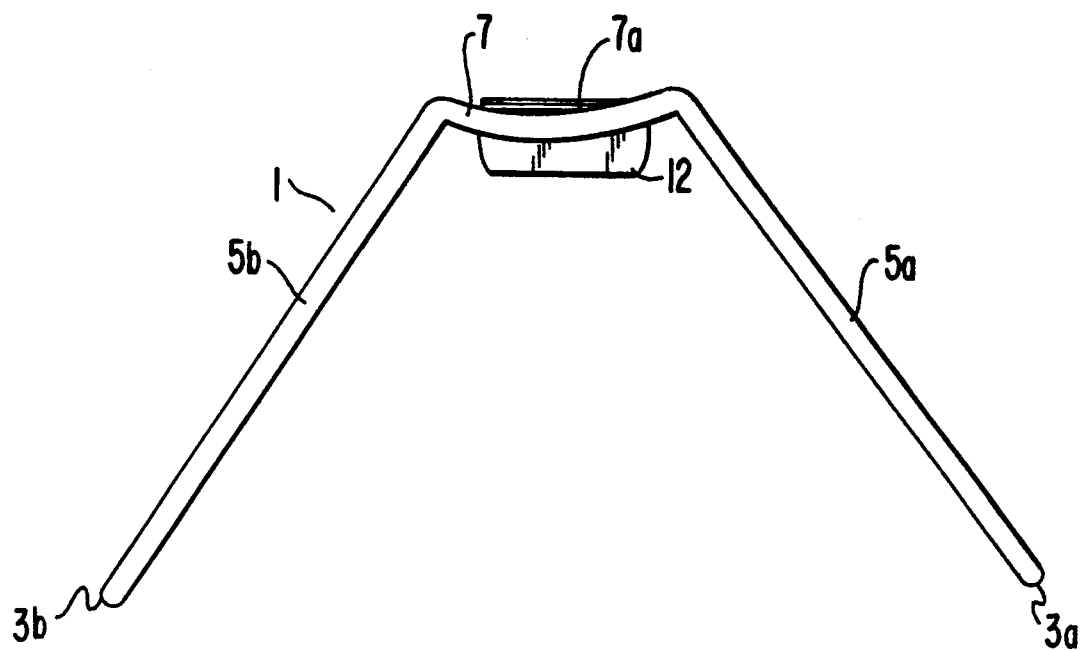
FIG. 7 is an elevation view of a tape tip body measuring device according to one embodiment of the present invention which illustrates the insertion of a hooking portion of the tape measure into the slot of the tape body.
Figure 8:
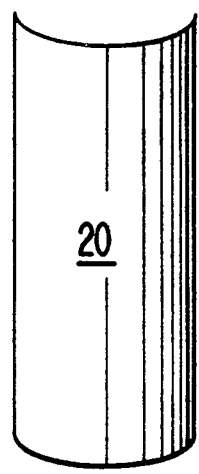
FIG. 8 is an oblique view of a retaining member according to one embodiment of the present invention.

The present invention describes a tape tip body which is attachable to a measuring device and which is adapted to be pushed across a surface to be measured. Referring now to FIGS. 1 and 2, a tape tip body 1 according to one embodiment of the present invention is made of Lexan plastic. Many other materials would be suitable for the construction of operable tape tip bodies including other plastics, wire, wood, and other familiar construction materials. The top of the tape tip body 1 can be provided, for example, with an attachment portion 7 which has a concave bend 7a to conform to a curve, for example, of a measuring tape. The attachment portion 7 is provided with a slot 2. The tape tip body 1 is provided with right and left legs 5a,b to support the attachment portion 7. The attachment portion 7, in turn, stabilizes and maintains the relative position of the right and left legs 5a,b. In the preferred embodiment, the legs 5a,b are formed from the same piece of material as the attachment portion 7. Other embodiments may require that the legs be secured to the attachment portion by, for example, welds, adhesives, fasteners or other attachment methods. Each of the right and left legs 5a,b have runner edges 3a,b, each having an arcuate configuration, for example, to allow the tape tip body 1 to slide over rough surfaces such as shingles or tiles in a motion similar to that of a sled over snow. Of course, the plastic legs 5a,b with runner edges 3a,b of the preferred embodiment can easily be replaced by wire legs which are bent, for example, into a parabolic trapozoid or other appropriate shape to provide runner edges. Moreover, the legs 5a,b can be provided with wheels 4 with axles 9 (FIGS. 3a and 3b) or with track rollers 8a and tracks 8b (FIGS. 4a and 4b).

Referring back to FIGS. 1 and 2, the right and left legs 5a,b may extend downward at obtuse angles 11 relative to the attachment portion 7 for added stability. The right and left legs 5a,b may also be provided with cutouts 6 to reduce weight and to provide stability under windy conditions. Of course, other embodiments, such as those having legs constructed of wire, would be inherently stable under windy conditions.

Referring now to FIGS. 5–8, it can be seen that the tape tip body 1 of the present invention can be quickly and easily attached to any standard semi-rigid tape measure 11, such as a 30-foot Stanley tape measure to form a tape measuring device. The concave bend 7a of attachment portion 7 is designed such that it laterally extends beyond edges 13a of a tape blade 13 of the tape measure 11. A hook 12 normally found on the end of the tape blade 13 can be placed through the slot 2 found on the attachment portion 7 of the tape tip body 1 such that the bottom of the tape blade 13 rests snugly against a contact region on the top of the attachment portion 7 and such that longitudinal motion of the tape blade 13 relative to the tape tip body 1 is restricted. The tape blade 13 can then be secured to the tape tip body 1, for example, by cementing a transparent top retainer 20 (shown in FIGS. 6 and 8) over the tape blade and applying a plastic cement at points 20a (shown in FIG. 6). Of course, a detachable configuration using, for example, a Velcro retainer or a hinged configuration, is immediately obvious.

Other alternative methods for attaching the tape body 1 to the tape blade 13 are also acceptable. For example, in FIG. 5, the tape blade 13 is attached to the tape tip body 1 by drilling holes in the tape blade 13 and the attachment portion 7 and securing them to one another by means of pop rivets 21.

Figure 9:
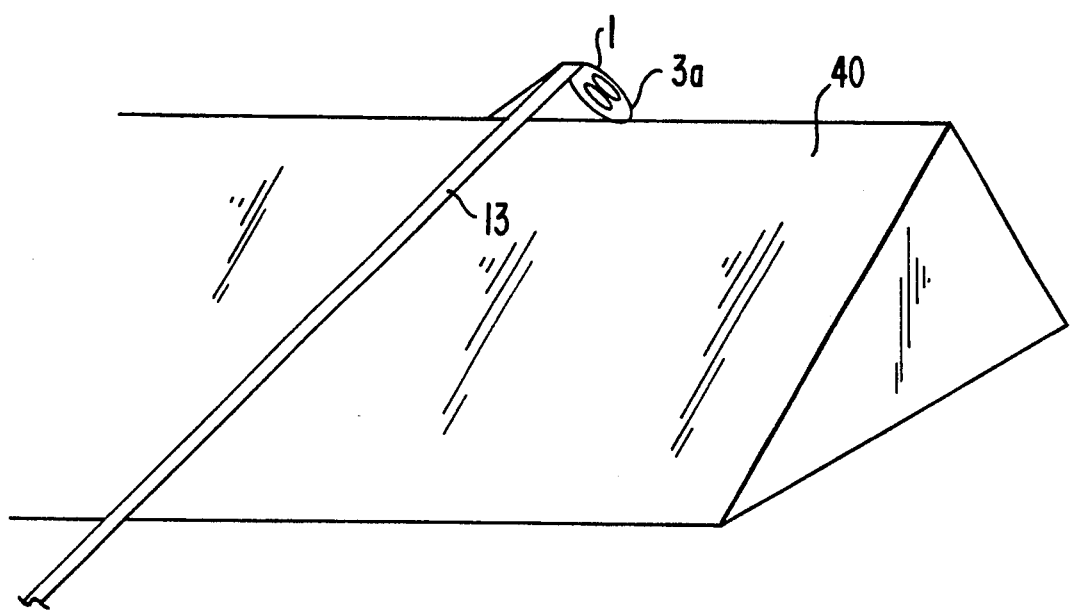
FIG. 9 illustrates the viewpoint of a person using an embodiment of the tape tip body measuring device when the tape tip body is near the ridge of a roof.
Figure 10:
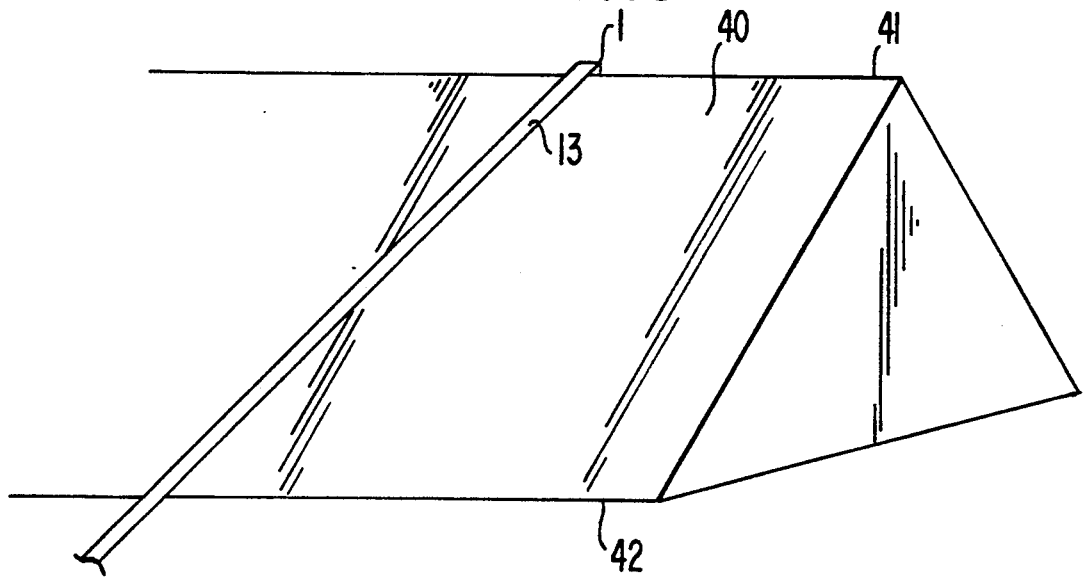
FIG. 10 illustrates the viewpoint of a person using the tape tip body measuring device of the present invention when the tape tip body has just passed the ridge of the roof.

Referring now to FIGS. 9 and 10, the use of the tape tip measuring device from an eave 42 of a roof 40 is quite simple. For example, as the tape blade 13 is fed from the tape measure to advance the tape tip body 1 up the slope of the roof 40, the runners 3a,b of tape tip body 1 will slide up and over the edges of the roof shingles or tiles, avoiding sufficient resistance that would otherwise cause the tape blade 13 to bend. As the tape blade 13 is extended, the tape blade 13 in the vicinity of the tape tip body 1 is visually elevated as is shown in FIG. 9. When the tape tip body 1 reaches the ridge 41 of the roof 40, the runners 3a,b will slide over and down the opposite side of the roof 40 providing a visual verification that the ridge 41 of the roof 40 has been reached (see FIG. 10).

An accurate measurement of the eave-to-ridge distance can be provided, for example, by taking a measurement at the eave 42 of the roof after the tape tip body 1 clears the ridge 41 of the roof 40 and the tape blade 3 is no longer elevated with respect to the side of the roof facing the viewer. An empirically determined length can then be subtracted from the measured length which accounts for the geometry of the tape tip body 1. Another measurement technique may be conducted by taking a measurement at the eave 42 when the tape tip body 1 is at its apex on the ridge 41 and subtracting a value which is empirically determined or based, for example, on the equation of a catenary.

After the measurement has been determined, the tape blade 13 is easily retrieved because the runners 3a,b will again slide over the roof shingles or tiles with ease. The ease of retrieval of the tape blade 13 will prolong the life of the tape measure 11.

Referring now to FIGS. 11 and 12, an embodiment of the tape tip body 1 of the present invention can be easily fabricated, for example, by the following steps. First, a sheet of Lexan plastic or other appropriate material is obtained. Then, a substantially oval shape 30 having a minor axis of symmetry 31, as shown in FIG. 11, is formed from the plastic. A slot 2 and cutouts 6 are then formed in the oval shape 30, as shown in FIG. 12. A tape tip body 1 like that shown in FIGS. 1 and 2 is finally formed by folding the form shown in FIG. 12 along lines 32 and 33 and providing a concave bend within the portion between the lines 32 and 33.

Accordingly, the advantages of the tape tip body measuring device of the present invention over the prior art can be easily seen.

With this device, accurate measurement of steep, dangerous or unclimbable roofs can be easily accomplished from the eaves of the roof. As the tape tip body is pushed up the roof slope, the tape slides over the rough roof shingles or tiles without significant resistance. The tape tip body remains visually elevated at the end of the tape blade until the ridge of the roof is reached. When the tape tip body passes over the ridge of the roof, the elevated tip falls from the view of the user, thereby confirming the correct position of the ridge relative to the eave of the roof.

This system provides a number of advantages over the prior art. First, semi-rigid automatic-retrieval measuring tapes of the prior art cannot be satisfactorily pushed up a slope of the roof, because the tape tip tends to catch the rough edges of the roof shingles or tiles, bending the tape which then falls down the slope. The steeper the roof slope, the more pronounced the problem becomes. Second, assuming the prior art tape can be manipulated to reach the ridge of the roof from the eave, the user has no way to visually verify that the tape tip is exactly at the ridge of the roof. For example, the tape tip can extend several inches, or even a foot or more, past the ridge and still not be visible to the user. Third, the traditional method of measurement (i.e., climbing the roof) is dangerous and, although capable of providing accurate measurements, exposes the adjustor to the risk of serious falls and physical injury. Additionally, this method requires additional time and results in lower productivity.

Finally, measurement of unclimbable roofs is often effected by throwing a weighted flexible tape over the ridge of the roof, slowly pulling the tape over the ridge, and taking the measurement as the tape passes the ridge. Timing is of the utmost importance with this technique, and it is very difficult to obtain reliable measurements. Also, a danger exists in that the flexible metal tape can be accidentally thrown over electrical wires with a potentially fatal electrical shock possible.

Accordingly, the tape tip body measuring device of the present invention provides a user with a device which is safer, more accurate, and more productive than prior art systems for measuring steep, dangerous, difficult or unclimbable roofs. This system results in a time savings, and therefore an increase in productivity and profitability. Moreover, the safety tip measuring device of the present invention allows roofs to be accurately measured without the possibility of serious falls or electrical shock. Thus, the tap tip body measurement system of the present invention solves most of the current problems in the measurement of steep, dangerous, or unclimbable roofs.

I claim:

1. A tape tip body attachable to a measuring device and adapted to be pushed across a surface;
    an attachment portion having a contact region for contact with said measuring tape; and
    transportation means associated with said attachment portion adapted to allow said tape tip body to move across a roof surface,
    wherein said attachment portion prevents relative movement between said tape tip body and said measuring tape.

2. The tape tip body of claim 1, wherein said transportation means further comprises:
    a first leg extending away from and behind said contact region of said attachment portion; and
    a second leg substantially similar to said first leg, said second leg extending away from and behind said contact region of said attachment portion and being positioned relative to said first leg such that a stable base is provided for supporting said measuring tape when said measuring tape is attached to said attachment portion of said tape tip body.

3. The tape tip body of claim 2, wherein said transportation means further comprises an arcuate portion provided at ends of said first and second legs remote from said attachment portion.

4. The tape tip body of claim 2, wherein said transportation means further comprises at least one wheel attached to each of said first and second legs.

5. The tape tip body of claim 2, wherein said transportation means further comprises a plurality of track rollers attached to each of said first and second legs and first and second tracks corresponding to each of said first and second legs mounted on said track rollers.

6. The tape tip body of claim 2, wherein said first and second legs are substantially planar.

7. The tape tip body of claim 6, wherein said first and second substantially planar legs are provided with cutouts to reduce a wind resistance of said tape tip body.

8. The tape tip body of claim 1, wherein said contact region of said attachment portion has a surface configuration corresponding to a surface configuration of said measuring tape.

9. The tape tip body of claim 8, wherein said contact region surface configuration and said measuring tape surface configuration are concave.

10. The tape tip body of claim 8, further comprising a retaining member having a surface configuration corresponding to said measuring tape surface configuration and said contact region surface configuration.

11. The tape tip body of claim 8, wherein said contact region of said attachment portion further comprises a slot for receiving a hook member attached to an end of said measuring tape.

12. A tape tip measuring device comprising a measuring device attached to a tape tip body adapted to be pushed across a surface to be measured;
    a graduated measuring tape;
    an attachment portion having a contact region for contact with said measuring tape; and transportation means associated with said attachment portion adapted to allow said tape tip body to move across a roof surface,
wherein said attachment portion prevents relative movement between said tape tip body and said measuring device.

13. The tape tip measuring device of claim 12, wherein said transportation means further comprises:
a first leg extending away from and behind said contact region of said attachment portion; and
a second leg substantially similar to said first leg, said second leg extending away from and behind said contact region of said attachment portion and being positioned relative to said first leg such that a stable base is provided for supporting said measuring tape when said measuring tape is attached to said attachment portion of said tape tip body.

14. The tape tip measuring device of claim 13, wherein said transportation means further comprises an arcuate portion provided at ends of said first and second legs remote from said attachment portion.

15. The tape tip measuring device of claim 13, wherein said transportation means further comprises at least one wheel attached to each of said first and second legs.

16. The tape tip measuring device of claim 13, wherein said transportation means further comprises a plurality of rollers attached to each of said first and second legs and first and second tracks corresponding to each of said first and second legs mounted on said track rollers.

17. The tape tip measuring device of claim 13, wherein said first and second legs are substantially planar.

18. The tape tip measuring device of claim 17, wherein said first and second substantially planar legs are provided with cutouts to reduce a wind resistance of said tape tip body.

19. The tape tip measuring device of claim 12, wherein said contact region of said attachment portion has a surface configuration corresponding to a surface configuration of said measuring tape.

20. The tape tip measuring device of claim 19, wherein said contact region surface configuration and said measuring tape surface configuration are concave.

21. The tape tip measuring device of claim 19, further comprising a retaining member having a surface configuration corresponding to said measuring tape surface configuration and said contact region surface configuration.

22. The tape tip measuring device of claim 19, wherein said contact region of said attachment portion further comprises a slot for receiving a hook member attached to an end of said measuring tape.

23. A method of forming a tape tip body for attachment to a semi-rigid measuring tape, comprising the steps of:
obtaining a sheet of rigid or semi-rigid material;
cutting said sheet to form a shape having at least one axis of symmetry; and
folding said shape along at least one line which is parallel to said axis of symmetry to form first and second legs.

24. The method of forming a tape tip body of claim 23, further comprising the step of forming cutouts in each of said first and second legs to provide stability under windy conditions.

25. The method of forming a tape tip body of claim 24, wherein said shape is substantially oval with major and minor axes of symmetry and said shape is folded at two positions parallel to said minor axis of symmetry to provide said first and second legs and to provide a substantial contact region for attachment to said tape measure.

26. The method of forming a tape tip body of claim 25, further comprising the step of providing a concave bend in said contact region to conform to a corresponding concave surface of said measuring tape.

27. The method of forming a tape tip body of claim 26, further comprising the steps of forming a concave retaining member for sandwiching said tape measure between said concave contact region and said concave retaining member.

28. The method of forming a tape tip body of claim 25, further comprising the step of forming a slot in said contact region to accommodate a hooking portion affixed to an end of said measuring tape.

29. A method for accurately measuring the dimensions of roofs comprising the steps of:
obtaining a tape measuring device comprising a measuring device attached to a tape tip body adapted to be pushed across a surface to be measured;
advancing said tape tip body from an eave of said roof by feeding out a blade of said measuring tape;
observing a position at which said tape tip body disappears from view to verify the exact location of ridge of said roof;
noting the reading of said measuring tape at said eave; and
subtracting an empirically determined length from said reading to accurately determine the length of said roof from said ridge to said eave.

* * * * *